United States Patent
Sweeney

(10) Patent No.: US 11,912,383 B2
(45) Date of Patent: Feb. 27, 2024

(54) PERSONAL WATERCRAFT ROTISSERIE

(71) Applicant: Nicholas Sweeney, Waconia, MN (US)

(72) Inventor: Nicholas Sweeney, Waconia, MN (US)

(*) Notice: Subject to any disclaimer, the term of this patent is extended or adjusted under 35 U.S.C. 154(b) by 67 days.

(21) Appl. No.: 17/568,125

(22) Filed: Jan. 4, 2022

(65) Prior Publication Data
US 2022/0212765 A1    Jul. 7, 2022

Related U.S. Application Data

(60) Provisional application No. 63/133,499, filed on Jan. 4, 2021.

(51) Int. Cl.
*B63C 13/00* (2006.01)
*B62B 3/02* (2006.01)
*B62B 3/04* (2006.01)

(52) U.S. Cl.
CPC .............. *B63C 13/00* (2013.01); *B62B 3/02* (2013.01); *B62B 3/04* (2013.01); *B62B 2202/90* (2013.01)

(58) Field of Classification Search
CPC .. B63C 13/00; B62B 3/02; B62B 3/04; B62B 3/08; B62B 2202/90; B25H 1/18; B25H 1/0007
See application file for complete search history.

(56) References Cited

U.S. PATENT DOCUMENTS

| | | | | |
|---|---|---|---|---|
| 1,792,612 A * | 2/1931 | Staley | ........... | B25H 1/0007 248/676 |
| 1,834,294 A * | 12/1931 | Spahn | ........... | B25H 1/0007 248/397 |
| 2,340,707 A * | 2/1944 | Staley | ........... | B25H 1/0007 74/425 |
| 2,828,036 A * | 3/1958 | White | ........... | B60P 3/1033 298/5 |
| 2,985,448 A * | 5/1961 | Hancock | ........... | F16M 11/42 23/302 T |
| 2,991,994 A * | 7/1961 | Kulp | ........... | B25H 1/0007 269/286 |
| 2,997,292 A * | 8/1961 | Lucker | ........... | B66F 3/16 269/68 |
| 3,218,056 A * | 11/1965 | Kaplan | ........... | B25H 1/0007 269/61 |
| 4,239,197 A * | 12/1980 | Olstad | ........... | B25H 1/00 269/68 |

(Continued)

*Primary Examiner* — Brian L Swenson
(74) *Attorney, Agent, or Firm* — Boudwin Intellectual Property Law, LLC; Daniel Boudwin

(57) ABSTRACT

A personal watercraft rotisserie includes a lower frame having a pair of longitudinal members and a pair of lateral members, a support structure affixed to each lateral member of the lower frame, and an upper frame having a pair of longitudinal members and a pair of lateral members. Each lateral member of the upper frame is rotatably coupled to the support structures, such that the upper frame is rotatable about its longitudinal axis. The upper frame supports a personal watercraft which can be adjustably secured thereto via straps or other fasteners. A locking mechanism is configured to selectively secure the upper frame in a fixed position relative to the lower frame. In this way, an individual can support a personal watercraft in a desired rotational position to easily access the upper and lower hull for maintenance or repairs.

10 Claims, 4 Drawing Sheets

(56) References Cited

U.S. PATENT DOCUMENTS

| | | | |
|---|---|---|---|
| 4,686,925 A * | 8/1987 | Stuck | B63B 71/00 269/106 |
| 4,943,040 A * | 7/1990 | Finstad | B25H 1/04 269/69 |
| 5,051,056 A * | 9/1991 | Gibbons | B66C 23/48 269/68 |
| 5,324,005 A * | 6/1994 | Beattie | B25B 5/102 254/134 |
| 5,328,161 A * | 7/1994 | Stuck | B23K 37/0426 269/287 |
| 5,564,683 A * | 10/1996 | Stuck | B25B 11/00 269/69 |
| 6,863,271 B1 * | 3/2005 | Clouser | B25B 11/00 269/71 |
| 8,245,856 B1 | 8/2012 | Pappin et al. | |
| 10,252,410 B2 * | 4/2019 | Luis y Prado | B25H 1/04 |
| 11,034,277 B2 * | 6/2021 | Bacon | B63C 3/12 |
| 2005/0212191 A1 * | 9/2005 | McKelvie | B60S 13/00 269/17 |
| 2008/0105186 A1 * | 5/2008 | Johns, Jr. | B63B 27/36 114/259 |
| 2011/0101586 A1 * | 5/2011 | Lands | B25H 1/0007 269/57 |
| 2015/0001776 A1 * | 1/2015 | Bredemann | B63C 5/02 269/57 |
| 2017/0113595 A1 * | 4/2017 | Hemphill | B60P 7/0853 |
| 2018/0273363 A1 * | 9/2018 | Christian | B63C 15/00 |
| 2019/0193930 A1 * | 6/2019 | Grigsby, III | B65D 90/006 |

\* cited by examiner

PERSONAL WATERCRAFT ROTISSERIE

CROSS-REFERENCE TO RELATED APPLICATIONS

This application claims the benefit of U.S. Provisional Application No. 63/133,499 filed on Jan. 4, 2021. The above identified patent application is herein incorporated by reference in its entirety to provide continuity of disclosure.

BACKGROUND OF THE INVENTION

The present invention relates to a personal watercraft rotisserie. More specifically, the present invention provides a personal watercraft rotisserie that adjustably supports a personal watercraft such that it can be rotated about its lengthwise axis, allowing an individual to access all areas of the personal watercraft when performing repairs or maintenance.

Personal watercraft such as jet skis, wave runners, and the like are used by many individuals for recreational purposes. Because they are smaller and more lightweight than a traditional larger watercraft, personal watercraft can be transported, stored, and maintained easier. However, even the smallest personal watercraft are still heavy enough to require multiple individuals or machine assistance to move or position the personal watercraft. When repairs, general inspections, or maintenance is required, an individual must often access different areas of the personal watercraft, including the lower hull. It can be difficult to support or position the personal watercraft in such a way that the lower hull and other hard to reach areas are easily accessible. Some individuals may choose to utilize a crane or similar device to support the personal watercraft in an upright, raised position. This positioning only allows an individual to access the lower hull from beneath the personal watercraft, which can be dangerous if the personal watercraft not secured or supported correctly. Further, the individual may experience fatigue and strain due to the awkward angle required to access the lower hull from below. In order to address these concerns, the present invention provides a personal watercraft rotisserie that effectively secures and supports a personal watercraft while allowing it to be adjusted to a desired rotational position.

Devices have been disclosed in the known art that relate to personal watercraft rotisseries. These include devices that have been patented and disclosed in patent application publications. However, the devices in the known art have several drawbacks. For example, the devices in the known art typically lack an upper frame that provides even weight distribution for a supported personal watercraft. As such, these devices are more prone to failure. Additionally, the smaller mounting points can damage the personal watercraft. Further, the devices in the known art lack adjustable strap mounts for effectively securing the personal watercraft in a safe manner. The present invention improves upon the devices in the known art by providing additional structural and functional securement mechanisms that improve safety and overall effectiveness.

In light of the devices disclosed in the known art, it is submitted that the present invention substantially diverges in design elements from the known art and consequently it is clear that there is a need in the art for an improvement to existing personal watercraft support devices, particularly with regard to the above-described need for a personal watercraft rotisserie having a more safe and secure supporting frame that can be easily rotatably adjusted to a desired position. In this regard the present invention substantially fulfills these needs.

SUMMARY OF THE INVENTION

The present invention provides a personal watercraft rotisserie wherein the same can be utilized for effectively and safely supporting a personal watercraft at a desired rotational angle to easily access all areas of the personal watercraft for inspection, repairs, maintenance, or other purposes. The personal watercraft rotisserie generally includes a lower frame including a pair of longitudinal members and a pair of lateral members, a support structure affixed to each lateral member of the lower frame, and an upper frame including a pair of longitudinal members and a pair of lateral members, wherein each lateral member of the upper frame is rotatably coupled to the support structures, such that the upper frame is rotatable about its longitudinal axis. A locking mechanism is configured to selectively secure the upper frame in a fixed position relative to the lower frame. This allows an individual to support a personal watercraft at a desired angle in a safe and secure manner.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
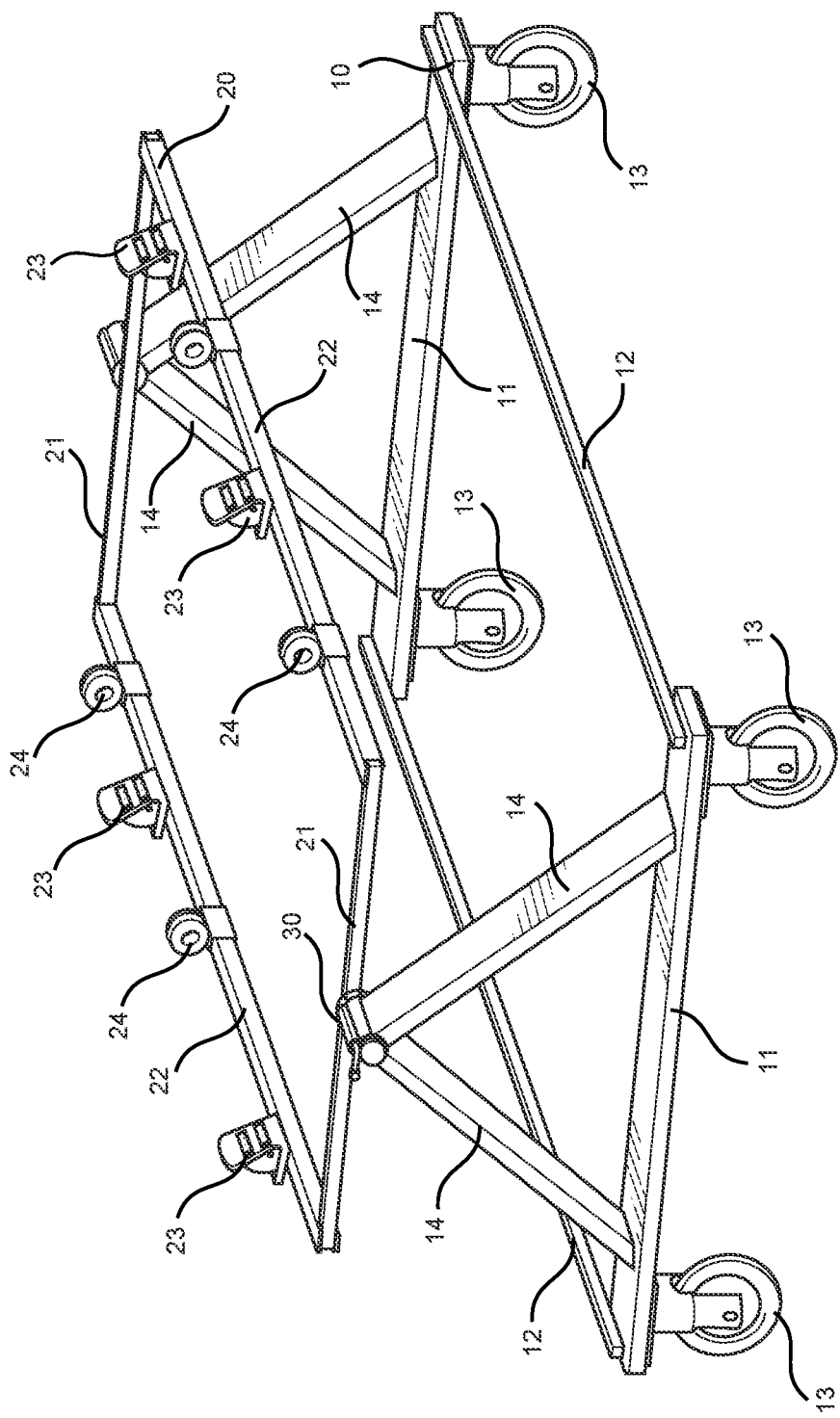
FIG. 1 shows a perspective view of an embodiment of the personal watercraft rotisserie.

Reference is made herein to the attached drawings. Like reference numerals are used throughout the drawings to depict like or similar elements of the personal watercraft rotisserie. For the purposes of presenting a brief and clear description of the present invention, a preferred embodiment will be discussed as used for supporting a personal watercraft in a desired position. As used herein, the term "personal watercraft" and its abbreviation "PWC" may refer to any watercraft that a rider sits or stands on, as opposed to within, as in a traditional boat. While an exemplary use of the present invention is to support a personal watercraft, the present invention is not limited to such use, and can be utilized to support any object that is capable of being secured thereto at a desired angle or rotational position.

Referring now to FIG. 1, there is shown a perspective view of an embodiment of the personal watercraft rotisserie. The personal watercraft rotisserie includes a lower frame 10 comprising a pair of longitudinal members 12 and a pair of lateral members 11, which define a generally rectangular shape in the shown embodiment, with an open center area. The longitudinal members 12 and lateral members 11 can be permanently or removably affixed to one another via any suitable means, including but not limited to welding or removable fasteners. In the shown embodiment the longitudinal members 12 and lateral members 11 are fixed in length, but other embodiments may include telescopically adjustable longitudinal members 12 and lateral members 11, which would allow the personal watercraft rotisserie to adjust in size to accommodate and effectively support different types and sizes of personal watercraft or other objects. In the shown embodiment, the lower frame 10 also includes multiple wheels 13 affixed thereto. This allows the user to easily move or transport the personal watercraft rotisserie. The wheels 13 may include pivoting castor mounts to allow the personal watercraft rotisserie to roll in any direction. Further, the wheels 13 may include wheel lock mechanisms to selectively prevent motion of the personal watercraft rotisserie when it is in use.

A support structure is affixed to each lateral member 11 of the lower frame 10. In the shown embodiment, each support structure includes a pair of struts 14 each affixed at a lower end to one of the lateral members 12 of the lower frames 10, such that the struts 14 extend upwardly at an angle to converge at an apex, defining an A-frame. This provides a stable and secure load-bearing mounting point for securing an upper frame 20 to the support structure. The upper frame 20 includes a pair of longitudinal members 22 and a pair of lateral members 21, defining a similar shape and structure to the lower frame 10. While shown as fixed in length, the upper longitudinal members 22 and lateral members 21 may also be telescopically adjustable in some embodiments. Each lateral member 11 of the upper frame is rotatably coupled to the support structures, such that the upper frame 20 is rotatable about its longitudinal axis. This allows individuals to rotate a personal watercraft supported on the upper frame 20 to a desired position. A locking mechanism 30 is configured to selectively secure the upper frame 20 in a fixed position relative to the lower frame 10, thereby maintaining a supported personal watercraft in a desired position.

Figure 4:
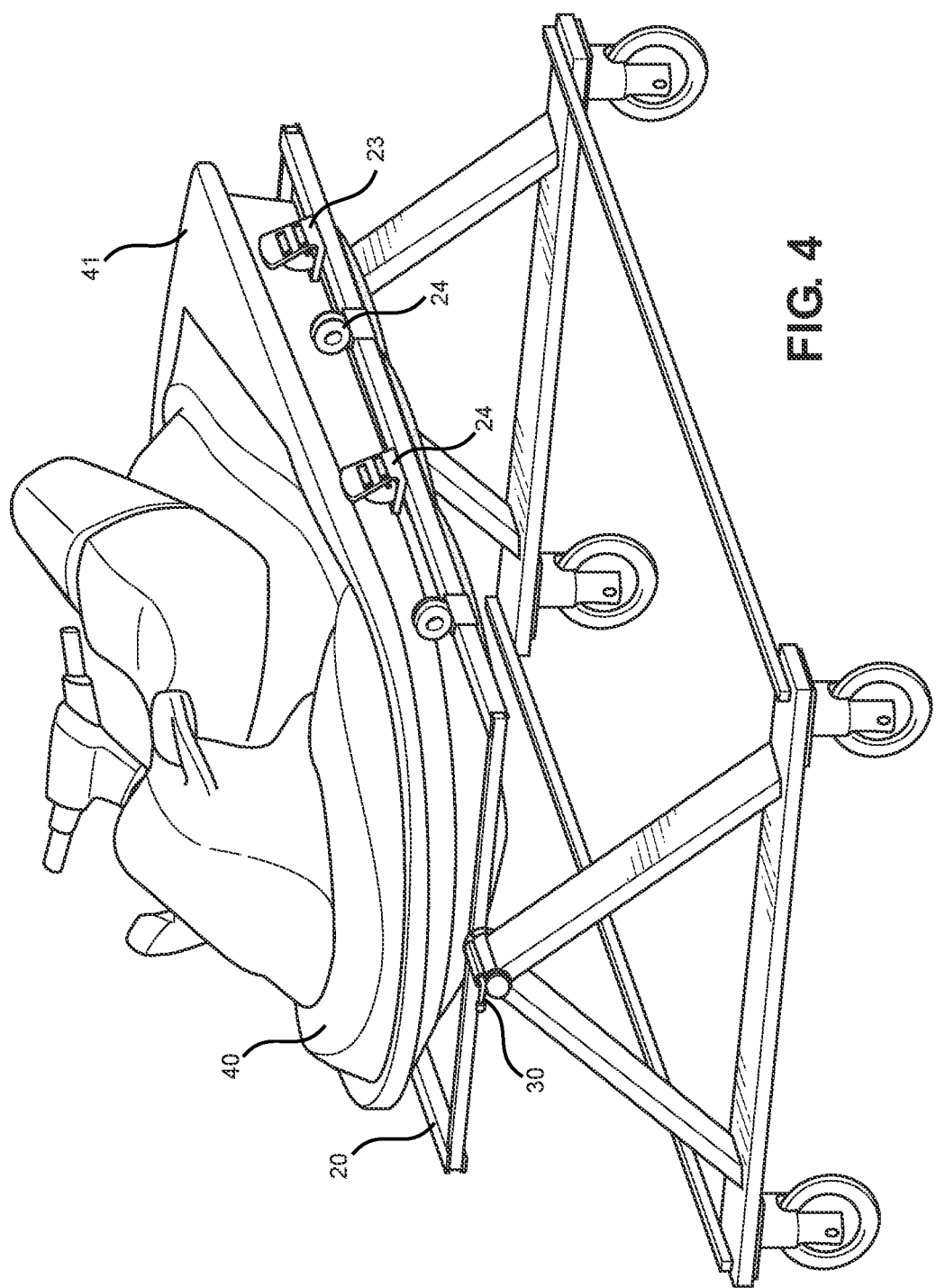
FIG. 4 shows a perspective view of an embodiment of the personal watercraft rotisserie supporting a personal watercraft that is rotated to an upright position.

The upper frame 20 further includes a plurality of rollers 24. The rollers 24 are configured to support a personal watercraft such that a lower hull of the personal watercraft extends downwardly through an open center area defined by a perimeter of the upper frame 20, which is shown in FIG. 4. The rollers 24 can include a foam material so as not to damage a supported personal watercraft. In other embodiments, other supports or mounting points for the personal watercraft may be utilized. For example, additional straps may extend across the open center area of the upper frame 20 to provide further support for a personal watercraft. Further, the shown embodiment includes ratcheting strap mounts 23 that can adjustably receive a strap or similar fastener. The strap can be wrapped around the personal watercraft to effectively secure it to the upper frame 20 no matter the rotational position of the upper frame 20. In other embodiments, other types of fasteners or mounting points may be utilized to secure the personal watercraft to the upper frame 20.

Figure 2:
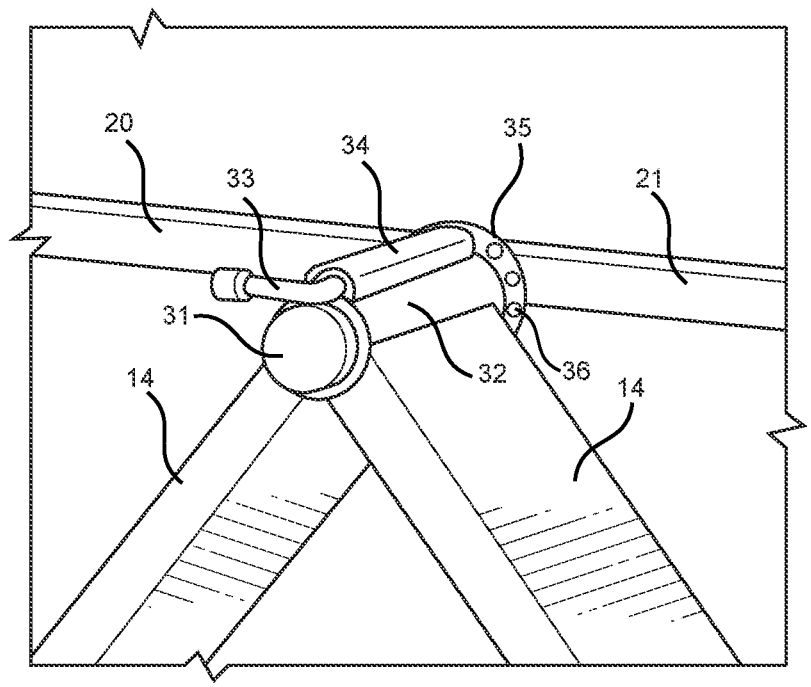
FIG. 2 shows a perspective view of the locking mechanism from an embodiment of the personal watercraft rotisserie.
Figure 3:
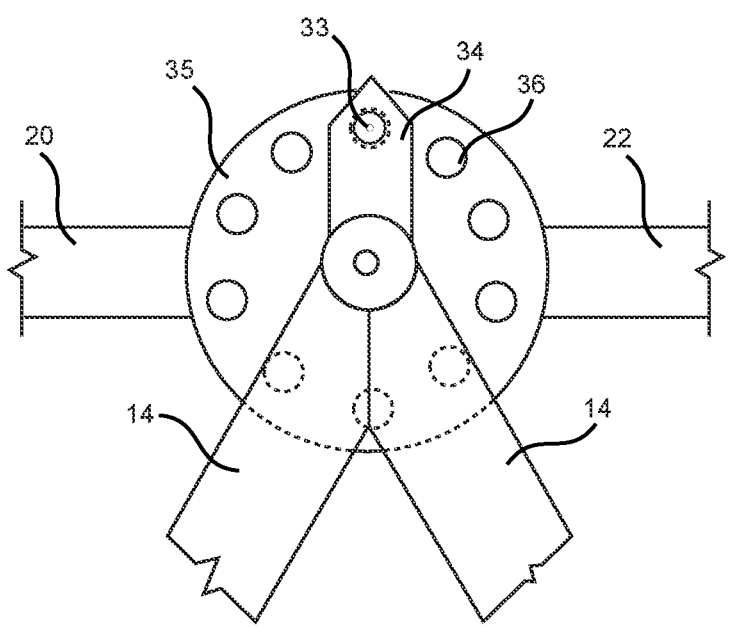
FIG. 3 shows a cross sectional view of the locking mechanism from an embodiment of the personal watercraft rotisserie.

Referring now to FIGS. 2 and 3, there is shown a perspective view of the locking mechanism from an embodiment of the personal watercraft rotisserie and a cross-sectional view of the locking mechanism from an embodiment of the personal watercraft rotisserie, respectively. In the shown embodiment, each lateral member 21 of the upper frame 20 includes an attached mounting pin 31 that extends into a mounting sleeve 32 affixed to each of the support structures at the upper end of the struts 14, such that the mounting pin 31 is rotatable within the mounting sleeve 32. This attaches the upper frame 20 to the support structures and allows for rotation to a desired position.

The locking mechanism in the shown embodiment includes a locking disk 35 affixed to the lateral member 21 of the upper frame 20. The locking disk 35 includes apertures 36 around its circumference that receive a locking pin 33. The locking pin 33 is slidably mounted to the one of the support structures. In the shown embodiment, the locking pin 33 is slidably inserted within a locking pin sleeve 34 attached to the upper side of the frame mounting pin sleeve 32. As shown in FIG. 3, which shows a cross sectional view of the locking mechanism, the locking pin 33 extends through one of the apertures 36 to prevent rotational movement of the upper frame 20.

To adjust the rotational position of the upper frame 20, the user pulls the locking pin 33 out of the aperture 36, rotates the upper frame 20 to the desired position, and reinserts the locking pin 33 into the new aperture 36. In the shown embodiment, the locking pin further comprises a handle projection on a distal end thereof which makes it easier to grasp and actuate. Further, in some embodiments, the locking pin sleeve 34 includes an internal spring that biases the locking pin 33 toward the locking disk 35. This prevents the locking pin 33 from accidentally being dislodged when the personal watercraft rotisserie is in use, thereby enhancing overall safety when using the personal watercraft rotisserie.

Figure 5:
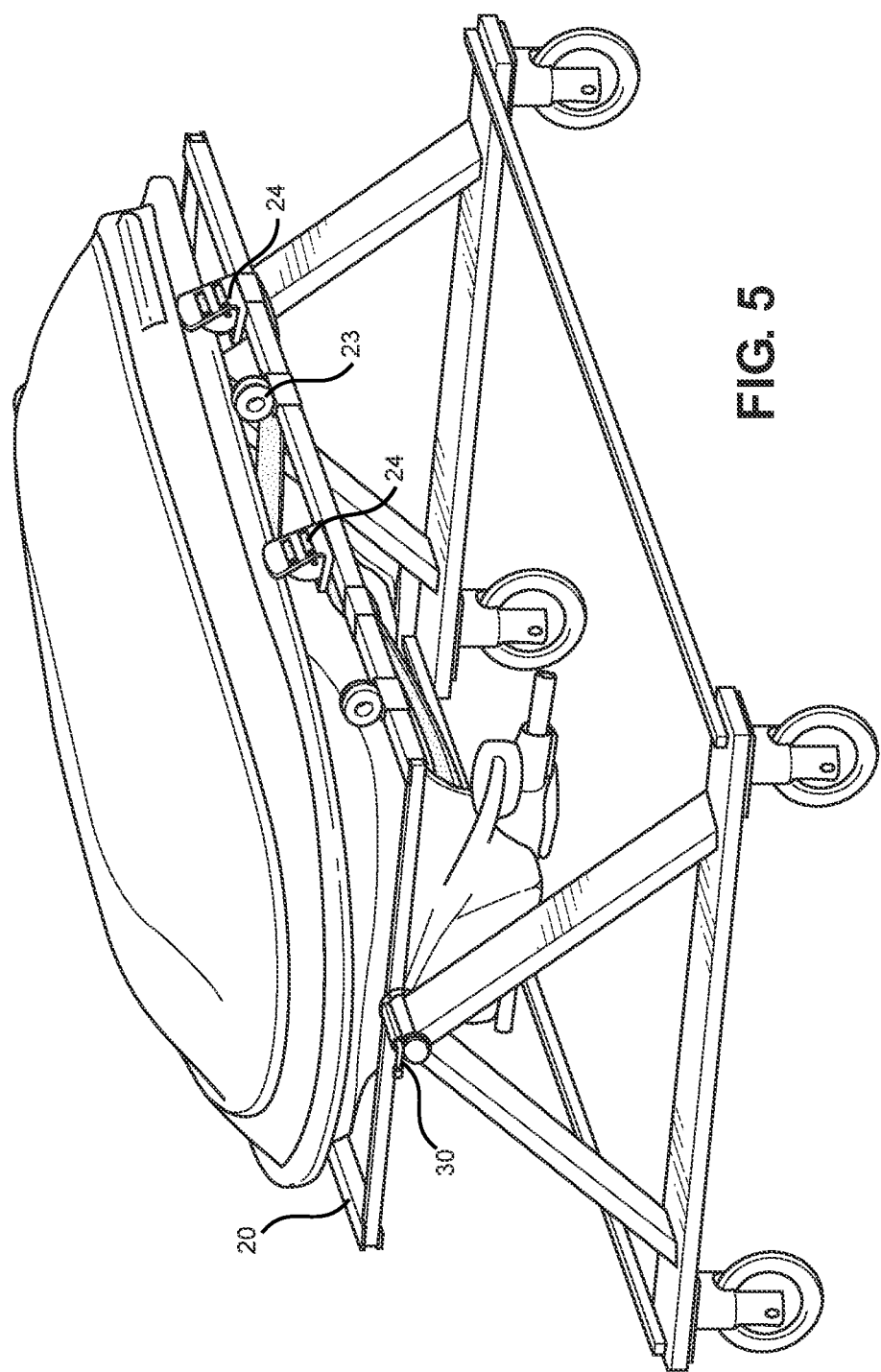
FIG. 5 shows a perspective view of an embodiment of the personal watercraft rotisserie supporting a personal watercraft that is rotated to an upside-down position.

Referring now to FIGS. 4 and 5, there is shown a perspective view of an embodiment of the personal watercraft rotisserie supporting a personal watercraft that is rotated to an upright position and a perspective view of an embodiment of the personal watercraft rotisserie supporting a personal watercraft that is rotated to an upside-down position, respectively. In operation, the user can position the personal watercraft 40 at any desired rotational angle. For example, in the upright position the user can access the upper hull 41. While not shown, straps extend through the strap mounts 23 to secure the personal watercraft to the upper frame 20. Additional straps may be affixed to the upper frame 20 to support the lower hull 41 of the personal watercraft, while personal watercraft 40 is supported on the support rollers 24 to provide a stable yet adjustable mounting option. The upper frame 20 can be rotated to a desired position when the locking pin 30 is disengaged from the locking disk. The user can then reinsert the locking pin 30 to secure the upper frame 20 in the desired position. In this way, the user can easily access the upper hull 41, lower hull 42, or any other area of the personal watercraft 40. Though not shown, some embodiments may include a step or similar attachment affixed to the lateral or longitudinal members of the lower frame. An individual may stand on the step to increase their effective height, allowing them to reach further across the supported personal watercraft to access difficult to reach areas from one end of the rotisserie.

It is therefore submitted that the present invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, and all equivalent relationships to those illustrated in the drawings and described in the specification are intended to be encompassed by the present invention.

The foregoing is considered as illustrative only of the principles of the invention. Further, it is not desired to limit the invention to the exact construction and operation shown and described, and accordingly, all suitable modifications and equivalents may be resorted to, falling within the scope of the invention.

I claim:

1. A personal watercraft rotisserie, comprising:
 a lower frame comprising a pair of longitudinal members and a pair of lateral members;
 a support structure affixed to each lateral member of the lower frame;
 an upper frame comprising a pair of longitudinal members and a pair of lateral members,
 wherein each lateral member of the upper frame is rotatably coupled to the support structures, such that the upper frame is rotatable about its longitudinal axis;
 a locking mechanism configured to selectively secure the upper frame in a fixed position relative to the lower frame;
 a plurality of rollers affixed to the upper frame, wherein the rollers are configured to support a personal watercraft such that a lower hull of the personal watercraft extends downwardly through an open center area defined by a perimeter of the upper frame;
 wherein a user positions the personal watercraft at any desired rotational angle; and
 wherein the personal watercraft is rotated to an upside-down position.

2. The personal watercraft rotisserie of claim 1, further comprising wheels affixed to the lower frame.

3. The personal watercraft rotisserie of claim 1, wherein each support structure comprises a pair of struts each affixed at a lower end to one of the lateral members of the lower frames and extending upwardly at an angle to converge at an apex, defining an A-frame.

4. The personal watercraft rotisserie of claim 1, wherein the upper frame includes a pair of mounting pins that each extend into a mounting sleeve affixed to each of the support structures, such that the mounting pin is rotatable within the mounting sleeve.

5. The personal watercraft rotisserie of claim 1, wherein the rollers are composed of a foam material.

6. The personal watercraft rotisserie of claim 1, further comprising a plurality of strap mounts affixed to the upper frame.

7. The personal watercraft rotisserie of claim 6, wherein the strap mounts comprise ratcheting strap lock mechanisms.

8. The personal watercraft rotisserie of claim 1, wherein the locking mechanism further comprises a locking disk affixed to the upper frame having apertures that receive a locking pin that is slidably mounted to the one of the support structures.

9. The personal watercraft rotisserie of claim 8, wherein the locking pin further comprises a handle projection on a distal end thereof.

10. The personal watercraft rotisserie of claim 8, wherein the locking pin engages a spring that biases the locking pin toward the locking disk.

* * * * *